United States Patent [19]

Inouye et al.

[11] Patent Number: 4,479,690
[45] Date of Patent: Oct. 30, 1984

[54] UNDERWATER SPLICE FOR SUBMARINE COAXIAL CABLE

[75] Inventors: Alan T. Inouye, Ventura; Jeffrey V. Wilson, Camarillo; Wayne R. Tausig; Thorndyke Roe, Jr., both of Oxnard, all of Calif.

[73] Assignee: The United States of America as represented by the Secretary of the Navy

[21] Appl. No.: 417,740

[22] Filed: Sep. 13, 1982

[51] Int. Cl.³ .............................................. H01R 4/00
[52] U.S. Cl. .............................. 339/94 C; 339/117 R; 339/60 C
[58] Field of Search ................. 339/94, 115, 116, 117, 339/273 S; 174/8, 12 R; 92/92, 93, 96

[56] References Cited

U.S. PATENT DOCUMENTS

| 3,158,420 | 11/1964 | Olson et al. | 339/96 |
| 3,398,392 | 8/1968 | Henderson | 339/117 |
| 3,508,188 | 4/1970 | Buck | 339/117 R |
| 3,533,047 | 10/1970 | McFarlane | 339/94 |
| 3,571,783 | 3/1971 | Lusk | 339/117 |
| 3,593,415 | 7/1971 | Wofford | 339/117 R |
| 3,742,247 | 6/1973 | Ballard | 339/117 R |
| 3,972,581 | 8/1976 | Oldham | 339/96 |
| 4,039,242 | 8/1977 | Wilson et al. | 339/117 R |
| 4,050,765 | 9/1977 | Duesterhoeft et al. | 339/117 R |
| 4,085,993 | 4/1978 | Cairns | 339/117 R |
| 4,174,875 | 11/1979 | Wilson et al. | 339/91 P |
| 4,192,567 | 3/1980 | Mucci | 339/117 R |
| 4,192,569 | 3/1980 | Mucci | 339/117 R |
| 4,362,352 | 12/1982 | Hawkins et al. | 339/273 S |
| 4,373,767 | 2/1983 | Cairns | 339/94 C |

FOREIGN PATENT DOCUMENTS 679221 9/1952 United Kingdom ........... 339/273 S

Primary Examiner—Joseph H. McGlynn
Assistant Examiner—David L. Pirlot
Attorney, Agent, or Firm—Robert F. Beers; Joseph M. St. Amand

[57] ABSTRACT

The invention is a device for splicing submarine coaxial cable underwater on the seafloor with a simple push-on operation to restore and maintain electrical and mechanical strength integrity; the splice device is mateable directly with the severed ends of a coaxial cable to be repaired. Splicing assemblies comprise a dielectric pressure compensating fluid filled guide cavity, a gelled castor oil cap and wiping seals for exclusion of seawater, electrical contacts, a cable strength restoration mechanism, and a pressure compensation system for controlled extrusion of and depletion loss prevention of dielectric seal fluid during cable splicing. A splice is made underwater by directly inserting prepared ends of coaxial cable, having no connector attachments, into splicing assemblies.

15 Claims, 8 Drawing Figures

UNDERWATER SPLICE FOR SUBMARINE COAXIAL CABLE

BACKGROUND OF THE INVENTION

This invention relates to an underwater mateable coaxial splice and particularly to underwater splice connectors which mate and connect underwater directly with the ends of coaxial cable.

There are thousands of miles of SD coaxial cable in the ocean which are used for communication and data acquisition purposes. Cable breaks occur each year, usually from trawling activity. Present methods to repair the cables are usually adequate but have two serious limitations: First, the existing seafloor cable system can be repaired only by being brought to the surface for splicing. Raising a seafloor cable to the surface involves grapnelling, which can cause further damage to the cable system; and if the cable is buried, grapnelling the cable to the surface becomes very difficult and may not be possible at all without a time-consuming unburial by a submersible vehicle. Second, each time a cable is brought to the surface, as much as a few miles of slack cable must be added to the section because of the depths to which these cables are laid. This added length is cumbersome to handle, degrades system performance by increasing attenuation, and is vulnerable to future damage. As more advanced systems are installed, these limitations become increasingly undesirable. Capability to splice the cable on the seafloor is needed to overcome these limitations.

SUMMARY OF THE INVENTION

The purpose of the present invention is to provide a means for splicing a submarine coaxial cable underwater on the seafloor with a simple push-on operation; the splice being operable to restore and maintain electrical and mechanical integrity in the presence of high voltage (e.g., 6,000 VDC) and under conditions requiring high quality impedance match, long life, and depth-independent operation.

It is also an object of the invention to provide a submarine cable splice that does not require two separate mateable connectors, but which only uses an underwater splice means that is mateable directly with the ends of a coaxial cable to be repaired.

A complete self-contained splice comprises a double-ended unit formed from two identical coupling assemblies connected back-to-back. Each of the coupling assemblies comprise a dielectric pressure compensating fluid (e.g., castor oil) filled guide cavity with a gelled castor oil cap and is provided with wiping seals, coaxial shield coupling, pressure compensation for extrusion of the dielectric seal fluid during coupling, and a cable strength restoration means where required. Coupling is made underwater by directly inserting prepared ends of the coaxial cable, at the break, into respective coupling assemblies in a simple push-on operation.

The ideal method of performing a splice on submarine coaxial cables is a "self-contained" splice. Self-contained means that the center steel-strength member/inner conductor, the polyethylene dielectric, the outer (shield) conductor, and the outer jacket are all incorporated into one single prefabricated splice mechanism. All that is required to make the splice is to prepare the cable end and insert the cable into the splice. Once the cable is inserted, the splice restores the electrical and mechanical characteristics of the cable. This approach is desirable, and is possible with the present invention.

DESCRIPTION OF THE PREFERRED EMBODIMENTS

Figure 1:
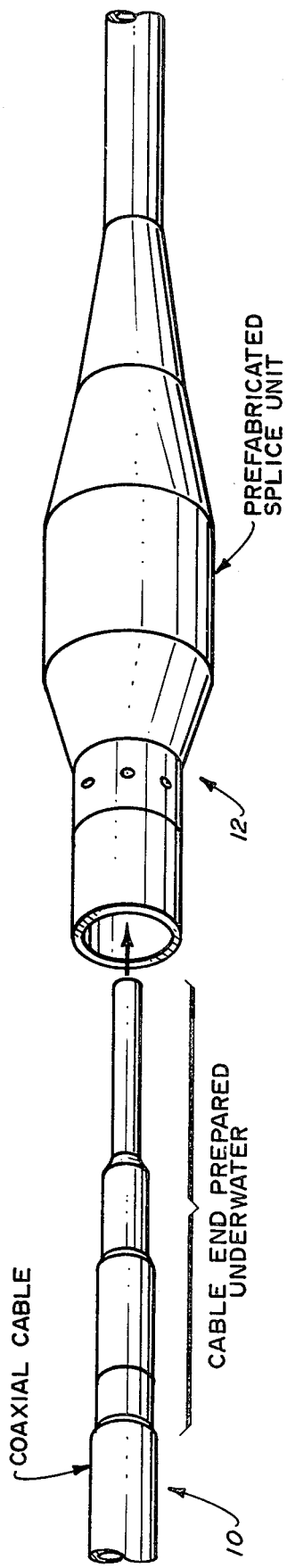
FIG. 1 shows a coaxial cable about to be inserted into a splice unit.
Figure 2:
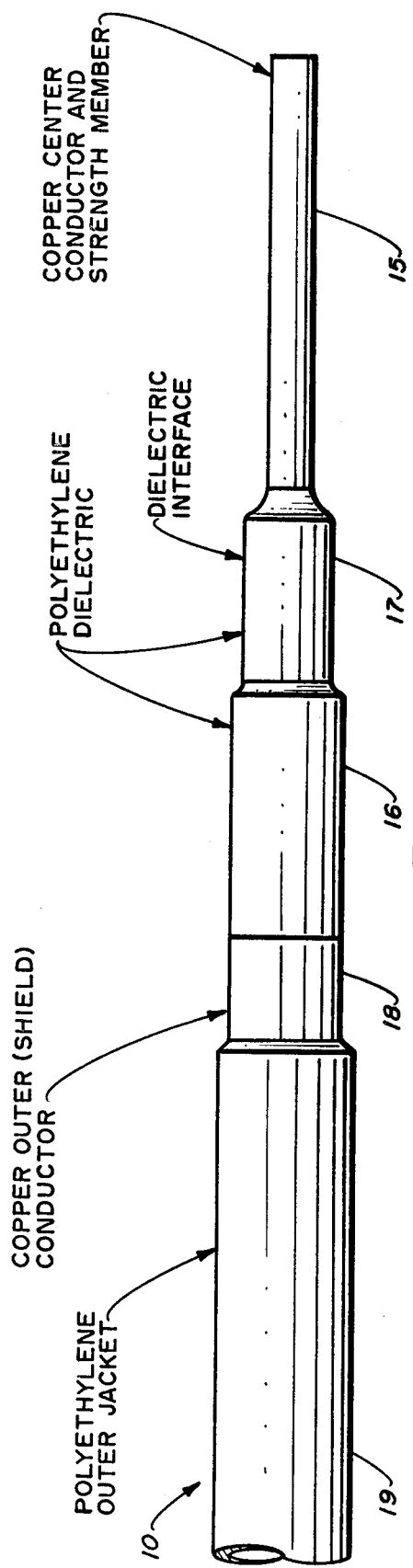
FIG. 2 shows the end of a coaxial cable prepared for splice.

Referring to the drawings, FIG. 1 shows the end of a coaxial cable 10 prepared for splice and ready to be inserted into one end of a self-contained splice unit 12. The coaxial cable 10 is prepared as shown in FIG. 2 to be accepted by the splice. The preparation process consists of removing a portion of the outer jacket, a portion of the outer (shield) conductor, and a portion of the dielectric; then the dielectric is fashioned in a lathe instrument to create the stepped shape; this can be done underwater. The coaxial cable 10, as shown in FIGS. 1 and 2 consists of a center conductor/strength member 15 covered with a dielectric 16 (e.g., polyethylene) stepped at 17 for interface purposes, outer (shield) conductor 18 (e.g., copper), and an outer dielectric jacket 19 (e.g., polyethylene).

Figure 3:
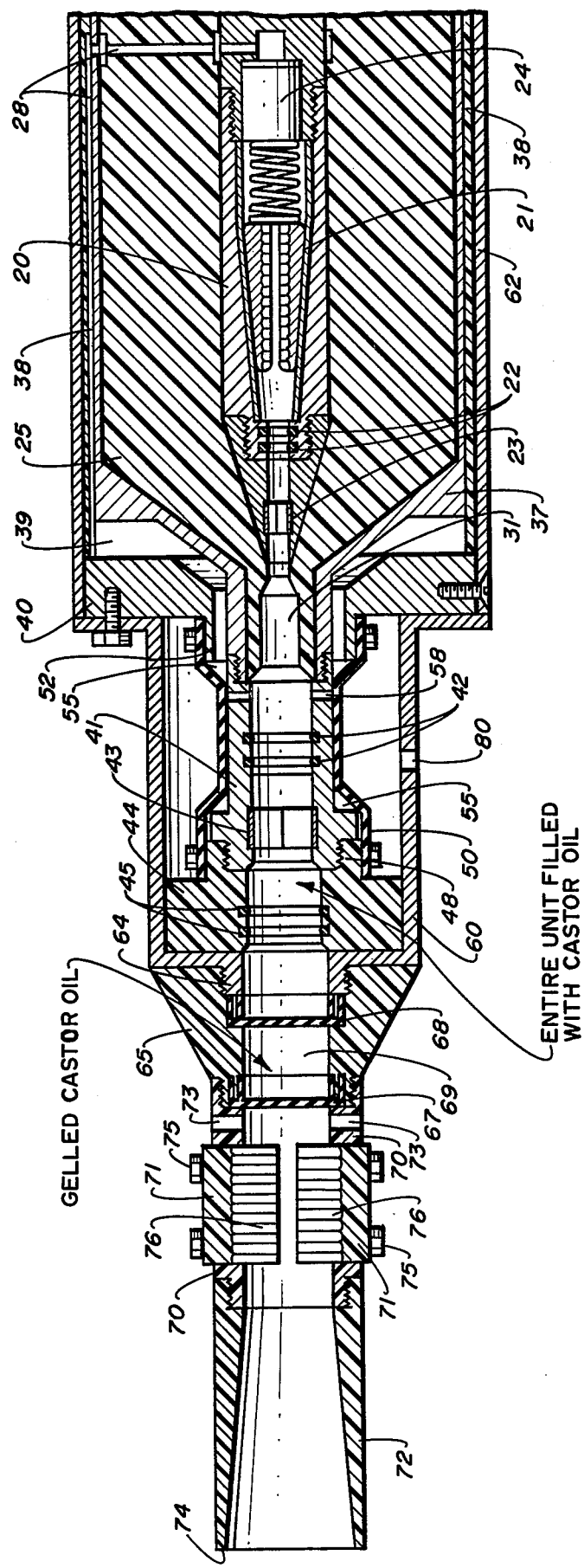
FIG. 3 is a longitudinal cross-sectional drawing of a splice coupling assembly.
Figure 4:
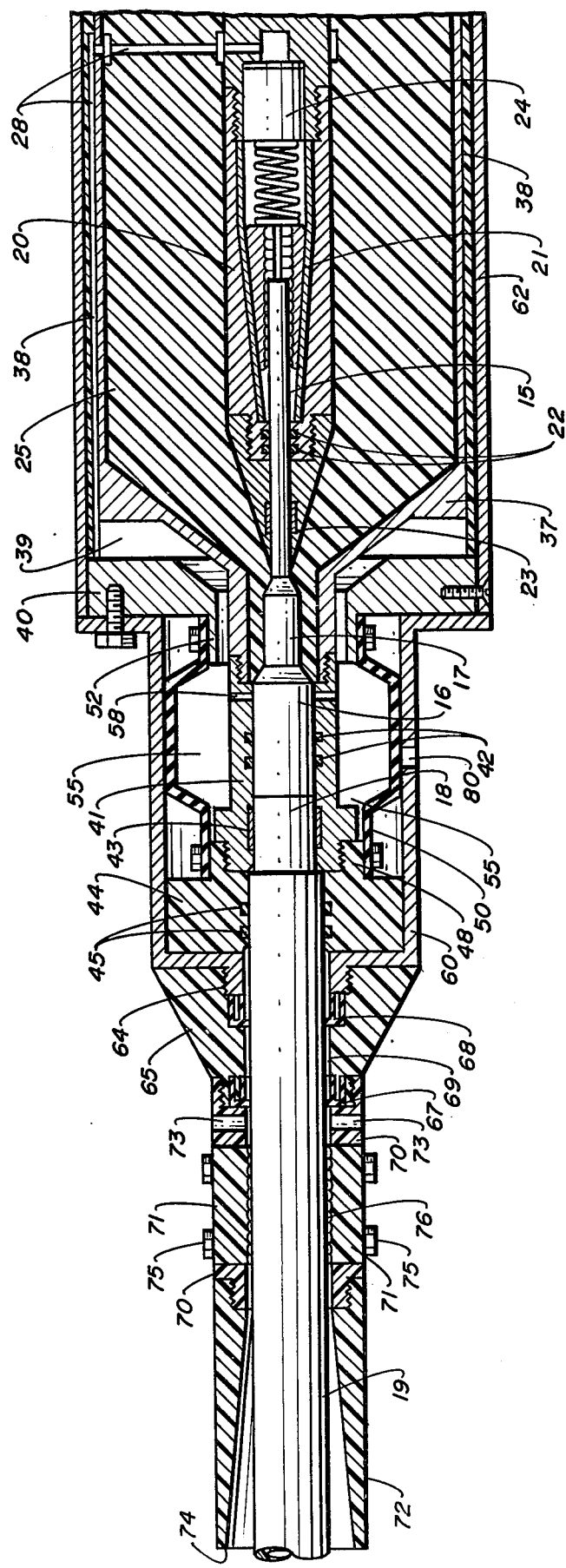
FIG. 4 is a drawing as in FIG. 3 with the coaxial cable inserted and coupled with the splice unit.
Figure 5:
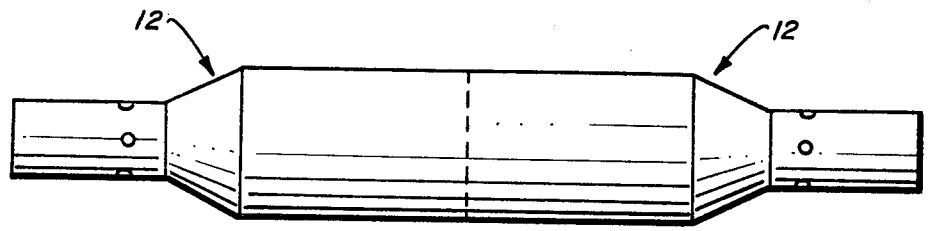
FIG. 5 is an illustration of a double ended splice unit, two coupling assemblies connected back-to-back.
Figure 6:
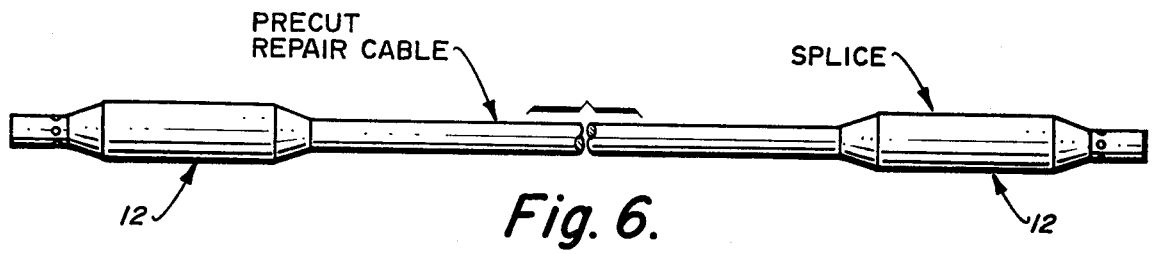
FIG. 6 shows a pair of coupling assemblies connected to a precut section of repair cable to form a longer splice unit.

FIGS. 3 and 4 show a coupling assembly 12, which comprises one-half of a complete splice unit. A complete splice unit requires two of the coupling devices shown, joined back-to-back, as in FIGS. 5 and 6, for example. FIG. 5 shows a double ended splice unit, and FIG. 6 shows a repair section of cable having a coupling assembly 12 at each end ready for use. In either case the underwater cable that is inserted into the coupling assembly does not require a special mateable coupler. Each coupling assembly 12 consists of a central metal housing 20 containing a cable strength restoration mechanism 21, to be described later. This central housing 20 includes two O-ring seals 22 which form an hermetic seal about a center conductor 15, a contact band 23 which provides reliable electrical contact with the center conductor and for completing the electrical path of center conductor 15, and a check valve 24 to allow dielectric fluid to pour through during coaxial cable insertion. The preferred embodiment uses a Multilam ® type contact band as described in U.S. Pat. No. 3,453,587, for contact band 23. A typical center conductor/strength member 15 consists of a stranded steel cable covered with a copper sheath. O-ring seals 22 and check valve 24 prevent the pressure compensating fluid (e.g., castor oil) from backing up under pressure and hosing up the cable along the spaces around the stranded steel cable in the center conductor 15 which, if allowed to do so, could result in depleting the splice of pressure compensating fluid. The contact band 23 electrical contact prevents the degrading of electrical contact during cable movement in an oil bath. The contact band 23 is effectively a spring-loaded contact which allows for movement while maintaining good contact with the coaxial cable inner conductor 15. Central housing 20 is tapered and fashioned to provide a smooth contour to prevent high voltage corona noise and for impedance matching. Central housing 20 is encased in a dielectric 25 of cast acrylic, for example, fashioned for impedance matching to the coaxial cable. Channel(s) 28 allow the pressure compensating fluid to move out from central housing 20 during cable insertion while check valve 24 prevents a reverse flow of the fluid back into the central housing. Interface area 31 is fashioned to provide a long breakdown path for high voltage and also a smooth transition of the electrical signals from the coaxial cable through the splice; it also provides a tapered path to guide the coaxial cable center conductor 15 into the strength restoration mechanism 21 in central housing 20.

An aluminum metal housing 37 covers the cast acrylic dielectric 25 to complete the electrical path of the coaxial cable outer (shield) conductor 18. A plurality of grooved or slotted sheets of polyvinylchloride (PVC) 38, cover the aluminum metal housing 37. The grooves or slots in the PVC sheets 38 run parallel to the longitudinal axis of the assembly and allow for movement of pressure compensating fluid from channel(s) 28 to space 39 between aluminum housing 37 and metal (e.g., steel) wall section 40. PVC sheets 38 isolate the splice from the seawater ground, and space 39 isolates wall section 40 from aluminum housing 37. Attached to the end of aluminum housing 37 is an aluminum tubular section 41 which holds a second pair of O-ring seals 42 to hermetically seal against dielectric 16 of the coaxial cable. The O-ring seals 42 can be semi-conductive if impedance matching is critical. Tubular section 41 also supports an electrical contact band 43 which makes reliable contact to the outer (shield) conductor 18 of the coaxial cable. A Multilam ® type contact band also is used in the preferred embodiment for electrical contact band 43. The double O-ring seals 42 prevent seawater from reaching the interface area 31 and prevent pressure compensating fluid from leaking out from the splice.

Attached to tubular section 41 is a PVC cylindrical section 44 which includes two O-ring seals 45 for hermetically sealing against the outer jacket 19 of the coaxial cable. PVC section 44 also provides electrical isolation of the splice from seawater ground and an attachment flange 48 for one side of pressure compensating fluid bladder (reservoir) 50. The other side of bladder 50 is attached to flange 52 on wall section 40 which is positioned away from aluminum housing 37 to provide space 39 that leads to the pressure compensating fluid reservoir 55 between tubular section 41 and bladder 50.

Prior to insertion of coaxial cable end, bladder 50 is in a collapsed state, as shown in FIG. 3. The bladder 50 serves to form a wall of the reservoir 55 for the pressure compensating fluid. A plurality of passageways 58 in tubular section 41 allows for free movement of pressure compensating fluid into and out of the interface area 31. During insertion of the coaxial cable the reservoir provides a place for the pressure compensating fluid to flow and prevents an hydraulic lock once the O-ring seals engage the cable. A protective pod 60 of steel, for example, fits over sections 41, 44 and bladder 50 and attaches to wall section 40. A protective cylindrical wall 62 of metal, for example, fits about wall section 40 and PVC sheets 38.

A central flanged passageway 64 at the end of pod 60 has a conical cap section 65 of PVC, for example, which attaches to flanged passageway 64. Conical cap section 65 includes a passageway 66 having a first perforated wiping seal 67 at one end and a second perforated wiping seal 68 at the opposite end. The space between the wiping seals 67 and 68 is filled with a gelled castor oil 69, for example, and the wiping seals and gelled castor oil serve to remove seawater during insertion of the coaxial cable. At the outer end of conical cap section 65 is a clamp section 70 which includes clamping portions 71 used to grip the outer jacket 19 of the coaxial cable; beyond clamp section 70 is a strain relief section 72 for the coaxial cable, made from PVC, for example. Passageways 73 are provided in clamp section 70 adjacent wiping seal 67 to allow the escape of seawater and gelled castor oil during insertion of the coaxial cable 10. If desired, a wiping seal can be included on the outer end 74 of strain relief section 72.

Clamping portions 71 of clamp section 70 can be tightened together by bolts 75, for example, causing the raised edges of grooves 76, shown in FIG. 3, to press into the polyethylene outer jacket 19, as shown in FIG. 4, to securely grip the jacket and prevent any slipping from the splice unit.

Openings 80 in protective pod 60 allow seawater to contact bladder 50 for pressure compensation without allowing seawater into the pressure compensating fluid. Castor oil is a preferable fluid to use as pressure compensating fluid, and the castor oil also serves as a dielectric to fill all voids to prevent high voltage breakdown and corona noise. A castor oil gel is used in the end cap at 69 to prevent the castor oil pressure compensating fluid from leaking out of the splice prior to and during coaxial cable insertion.

Until the coaxial cable is inserted, all the void areas in central housing 20, interface area 31, sections 41 and 44, passageways 58, and reservoir 55, from check valve 24 to wiping seal 68 are completely filled with pressure compensating fluid (e.g., castor oil), as are the fluid channels 28, those in 38 and space 39. Prior to insertion of the coaxial cable bladder 50 is substantially in a collapsed state.

In operation: The ends of the coaxial cable to be restored, are prepared as shown in FIG. 1 to be acceptable to the splice section. The preparation process consists of removing a portion of the outer jacket 19, removing a portion of the (shield) 18, and removing a portion of the dielectric, as shown in FIG. 1. Then the dielectric 16 is fashioned with a lathe instrument to create the stepped interface shape. The prepared end of the coaxial cable is stepped, as in FIG. 1, such that conductor 15, dielectric 16/17, shield 18, and jacket 19 will mate with strength restoration device 21/contact band 23, interface 31, contact band 43, and cap 65, respectively.

After the cable end is prepared, the cable is inserted into the splice. As the cable is inserted, the center-copper-cladded steel strength member 15 goes through the wiping seal 67 and the gelled castor oil cap 69. The wiping seals are designed to fit snugly over the center copper conductor and will stretch over the entire cable. They tear once over the center conductor.

At the same time the cable is being inserted and engaging the wiping seal, the gelled castor oil cap begins to flow out of the splice since it is being displaced by the cable. As the cable continues on and engages the secondary wiping seal 68, liquid castor oil in the inner area begins to flow out of the splice along with the gelled castor oil and prevents seawater from entering. It also helps the wiping seals to remove seawater out of the splice.

The leading edge of the cable (center conductor 15) enters the interface area 31 where the tapered interface guides the cable into the center metal housing 20. The leading edge engages the Multilam ® band 23 and the O-ring seals 22.

Once the O-rings 22 are engaged, the castor oil in the housing 20 begins to flow through the check valve 24 and into the oil reservoir 55 via the oil channels 28, 38, and 39. The cable passes into the strength restoration mechanism at this point.

At about the same time, the O-ring seals 42 for the dielectric 16 and seals 45 for outer jacket 19 engage the coaxial cable and castor oil in the interface area 31 flows into the oil reservoir 55 via passageways 58. The very small amount of oil trapped between the outer jacket seal 45 and dielectric seal 16 is forced to hose up the cable between the outer jacket and copper outer (shield) conductor 18 of the cable and provides positive pressure to the area between the seals. This oil will also force residual seawater, if any, up the cable and out of the electrical contact band 43 area.

The electrical contact band 43 engages the copper outer conductor 18 to complete the electrical path. The splice is designed so that about one inch of movement can be accommodated before the seals disengage from the cable.

With this invention: The actual repair of undersea cable can be completed within a few minutes compared to several hours using the present method of splicing the cable aboard ship; excessive slack is eliminated in the repaired section (this will reduce vulnerability to future damage by trawling activity and also reduce attenuation due to the excessive slack); and, repairs can be performed without disturbing adjacent structures.

Figure 7A:
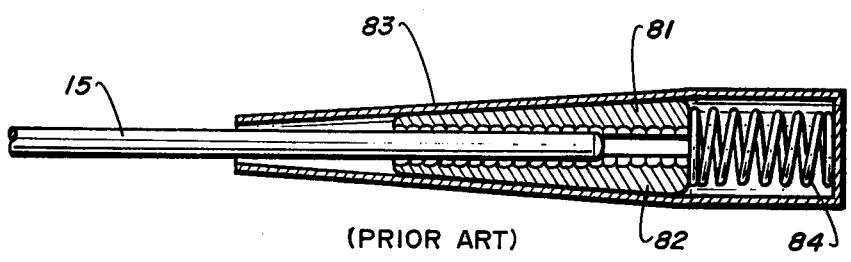
FIGS. 7a and 7b illustrate a suitable cable strength restoration mechanism that can be used with a coupling assembly.
Figure 7B:
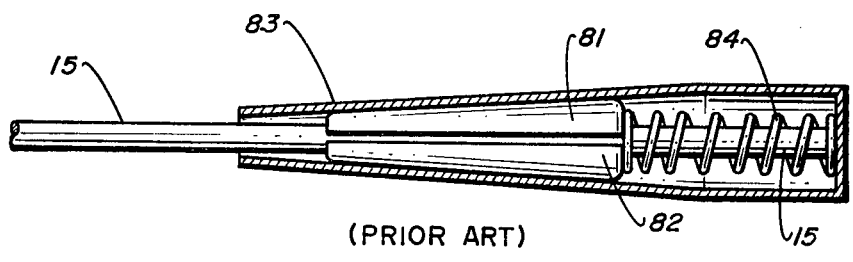

Ideally, the splice should appear nonexistent from an electrical and mechanical standpoint. Electrical contact bands 23 and 43 provide reliable electrical contact. The purpose of the cable mechanical strength restoration mechanism 21 is to restore a high percentage of the cable breaking strength. The cable strength restoration mechanism can be any suitable means for securely holding or gripping the center conductor/strength member 15, such as a clamping chuck or similar device. A typical quick connect prior art device, a spring-loaded chuck gripper mechanism, is illustrated in FIGS. 7a and 7b. In FIG. 7a, center conductor/strength member 15 is being inserted between two halves 81 and 82 of a long metal chuck in a long shallow tapered metal sleeve 83. The spring 84 tends to force the chuck toward the tapered end of the sleeve 83 bringing together the two halves 81 and 82 of the chuck. When the conductor 15 is inserted, the chuck is forced rearward against the spring until the chuck halves separate sufficiently to allow the conductor to be pushed all the way into sleeve 83. Spring 84 continues to pressure the chuck halves toward the narrow end of the sleeve engaging the conductor within the chuck gripping area, as shown in FIG. 7b, such that if the conductor 15 starts to back-out from the sleeve it will be gripped tighter by the chuck 81 and 82.

A means for splicing the cable in-place on the seafloor is provided by the present invention which eliminates the problems associated with conventional repair methods that require bringing the cable to the surface. No excessive added lengths of cable are required; adjacent components can remain undisturbed; and the buried cables need only the original damaged section exposed to perform the repair.

A typical in-situ repair scenario is as follows: An underwater splicing vehicle from a surface ship locates the damaged cable and cuts the cable. A test probe is placed on one cable end, and a Time Domain Reflectometer (TDR) is used to determine which portion of cable the fault is in and determines the approximate location of the damage. The cable is marked with a navigation reference (such as a transponder) and a low frequency tone generator is attached to the section in which the TDR detected a fault. The splicing vehicle then maneuvers along the cable, tracking it with TV, magnetometers, and the impressed line signal until the fault is located.

If the cable is severed, the damaged section can be removed and the good cable tested with the TDR to ensure that there is no additional damage. The splice is attached to the good end and then the splicing vehicle can maneuver to the other leg of the damaged cable and go through the same procedure. If the damaged section is extensive, then a splice with a repair section is required, rather than a double-ended splice.

A strength restoration device is not required if the coaxial cable is armoured since the strength then would be in the armour which would be terminated on the exterior of the splice.

Obviously, many modifications and variations of the present invention are possible in the light of the above teachings. It is therefore to be understood that within the scope of the appended claims the invention may be practiced otherwise than as specifically described.

What is claimed is

1. An electrical underwater splice device for direct connection with a prepared end of a submarine coaxial cable of the type consisting of a center conductor/strength member and a concentric outer shield conductor separated by an inner concentric dielectric layer and having an outer dielectric jacket, and which has the end thereof prepared in a stepped manner such that the center conductor/strength member projects beyond the end of the inner concentric dielectric layer, the inner concentric dielectric layer is step-shaped and extends beyond the end of the concentric outer shield conductor, and the concentric outer shield conductor extends beyond the end of the outer dielectric jacket to permit the end of the coaxial cable to interface and make connection with the interior of the splice device upon being inserted therein, comprising:

a. a female protective housing having a central opening therein and a longitudinal axis;

b. a female inner conductor and strength restoration means within and concentric along the longitudinal axis of said female protective housing having an entrance opening and which includes a first electrical contact means for making suitable electrical connection with and means for securely gripping the center conductor/strength member of the coaxial cable to prevent the back-out thereof;

c. a female outer conductor disposed within said female protective housing concentric with said inner conductor and strength restoration means;

d. a portion of said female outer conductor projecting longitudinally outward from one end of said female inner conductor and having a termination end which includes a second electrical contact means for making suitable electrical connection with the concentric outer shield conductor of the coaxial cable;

e. female inner dielectric means disposed between said female inner and outer conductors for providing electrical insulation therebetween and having an end thereof shaped to interface with the step-shaped inner concentric dielectric layer of the coaxial cable;

f. female outer dielectric means disposed between said female outer conductor and said female protective housing;

g. pressure compensating reservoir means disposed between said female outer conductor and said female protective housing;

h. dielectric pressure compensating fluid channels provided between said female inner conductor and strength restoration means and said pressure compensating reservoir, and between said longitudinally outward projecting portion of said female outer conductor and said pressure compensating reservoir;

i. said female outer dielectric means including longitudinal parallel grooves which allow for movement of pressure compensating fluid from said female inner conductor and strength restoration means to said pressure compensating reservoir means;

j. a pierceable end cap means mounted over the central opening to said female protective housing; said pierceable end cap means including a central passageway having a first wiping seal at the outer end thereof and a second wiping seal at the opposite end thereof, the space between said first and said second wiping seals being filled with a semi-mobile dielectric material which is forced out of the end cap means when displaced by the coaxial cable;

k. first hermetic seal means in said female inner conductor and strength restoration means for forming a watertight seal about the center conductor/strength member of said coaxial cable;

l. second hermetic seal means in said longitudinally outward projecting portion of said female outer conductor for forming a watertight seal with the inner concentric dielectric layer of the coaxial cable;

m. third hermetic seal means for providing a watertight seal with the outer dielectric jacket of the coaxial cable;

n. adjustable clamp means for firmly gripping the outer dielectric jacket of the coaxial cable to prevent slipping of the outer jacket on said coaxial cable;

o. all otherwise void spaces within said female protective housing central opening between the second wiping seal on said pierceable cap means and the end of said female inner conductor and strength restoration means including voids within said pressure compensating reservoir and said fluid channels being filled with dielectric pressure compensating fluid;

p. seawater passage means in said female housing to allow seawater pressure against said pressure compensating reservoir for pressure compensation purposes without allowing seawater into the dielectric pressure compensating fluid;

q. check valve means between said female inner conductor and strength restoration means and said fluid channels to said pressure compensating reservoir; said check valve means operating to prevent back-up of dielectric pressure compensating fluid from said pressure compensating reservoir means back into said female inner conductor and strength restoration means;

whereby upon insertion of the prepared end of the coaxial cable into the underwater splice device, the center conductor/strength member pierces each of the two wiping seals and displaces the semi-mobile dielectric material of said end cap means operating to force away any seawater that may adhere to the coaxial cable center conductor and then continues through the dielectric pressure compensating fluid to the inner conductor and strength restoration means where it makes electrical connection with said first contact means, engages said first hermetic seal means and is secured by said gripping means; said dielectric pressure compensating fluid, as it is displaced, also operating to assist said wiping seals and semi-mobile dielectric material to remove any seawater from the splice, and upon said first hermetic seal means engaging said center conductor/strength member said dielectric pressure compensating fluid inside the inner conductor and strength restoration means being forced to flow through said check valve means and said fluid channels to said pressure-compensating reservoir; said second hermetic seal means simultaneously engaging the inner concentric dielectric layer of the coaxial cable while excess dielectric pressure compensating fluid is forced to flow through said fluid channels from said longitudinally outward projecting portion of the female outer conductor to said pressure compensating reservoir; said third hermetic seal means also simultaneously engaging the outer dielectric jacket of the coaxial cable and forcing very little if any remaining dielectric pressure compensating fluid to hose up the coaxial cable between the concentric outer shield conductor and outer jacket, and said second electrical contact means making electrical connection with said coaxial cable concentric outer shield conductor, thus permitting reliable electrical and mechanical undersea splice repair of coaxial cable.

2. An underwater splice device as in claim 1 wherein said pressure compensating reservoir is expansible and in a substantially collapsed state prior to insertion of the prepared coaxial cable into the underwater splice device for connection therewith.

3. An underwater splice device as in claim 2 wherein said reservoir is a flexible bladder.

4. An underwater splice device as in claim 1 wherein said semi-mobile dielectric material is gelled castor oil.

5. An underwater splice device as in claim 1 wherein said first and said second electrical contact means are spring collar connections which allow for movement while maintaining good electrical contact with the coaxial cable conductor.

6. An underwater splice device as in claim 1 wherein said dielectric pressure compensating fluid is castor oil.

7. An underwater splice device as in claim 1 wherein said first hermetic seal means is located in said female inner conductor and strength restoration means between said first electrical contact means and said means for securely gripping the center conductor/strength member of the coaxial cable.

8. An underwater splice device as in claim 1 wherein said second hermetic seal means is located between said second electrical contact means and said dielectric pressure compensating fluid channels provided between the longitudinally outward projecting portion of said concentric female outer conductor and said pressure compensating reservoir.

9. An underwater splice device as in claim 1 wherein said third hermetic seal means is located between the entrance to said central opening in the female protective housing and the termination end of said longitudinally outward projecting portion of said female outer conductor.

10. An underwater splice device as in claim 1 wherein said check valve means is located at the end of said female inner conductor and strength restoration means opposite to the entrance thereto.

11. An underwater splice device as in claim 1 wherein a coaxial cable strain relief means is mounted outwardly from the end of said pierceable end cap means.

12. An underwater splice device as in claim 1 wherein said means for securely gripping the center conductor/strength member comprises spring biased chuck means in a tapered sleeve member and which operates to more forcefully grip said center conductor/strength member when an attempt is made to withdraw the same from said tapered sleeve member.

13. An underwater splice device as in claim 1 wherein said female protective housing is tapered to provide a smooth contour for impedance matching and prevention of high voltage corona noise.

14. An underwater splice device as in claim 1 wherein said clamp means for firmly gripping the outer dielectric jacket of the coaxial cable is attached to the outer end of said pierceable cap means.

15. An underwater splice device as in claim 14 wherein a said coaxial cable strain relief means is mounted outwardly from said clamp means.

* * * * *